(12) United States Patent
Wang et al.

(10) Patent No.: US 11,761,764 B2
(45) Date of Patent: Sep. 19, 2023

(54) METHOD AND LASER TRACKING SYSTEM FOR USING LASER LEVEL TO TRACK DETECTOR

(71) Applicant: NORTHWEST INSTRUMENT INC., Dover, NJ (US)

(72) Inventors: Weichen Wang, Shanghai (CN); Xin Shi, Shanghai (CN); David Xing, Dover, NJ (US)

(73) Assignee: NORTHWEST INSTRUMENT INC., Dover, NJ (US)

( * ) Notice: Subject to any disclaimer, the term of this patent is extended or adjusted under 35 U.S.C. 154(b) by 0 days.

(21) Appl. No.: 18/148,765

(22) Filed: Dec. 30, 2022

(65) Prior Publication Data

US 2023/0140336 A1 May 4, 2023

Related U.S. Application Data

(63) Continuation of application No. PCT/CN2021/104740, filed on Jul. 6, 2021.

(30) Foreign Application Priority Data

Dec. 31, 2020 (CN) .......................... 202011617437.1

(51) Int. Cl.
*G01C 15/00* (2006.01)
(52) U.S. Cl.
CPC .................................. *G01C 15/006* (2013.01)
(58) Field of Classification Search
None
See application file for complete search history.

(56) References Cited

U.S. PATENT DOCUMENTS

| 6,023,326 A * | 2/2000 | Katayama | ............ | G01C 15/002 |
| | | | | 33/290 |
| 9,407,364 B2 * | 8/2016 | Dumoulin | ............ | G01C 15/008 |

(Continued)

FOREIGN PATENT DOCUMENTS

| CN | 104061911 A | 9/2014 |
| CN | 104428626 A | 3/2015 |

(Continued)

OTHER PUBLICATIONS

The World Intellectual Property Organization (WIPO) International Search Report for PCT/CN2021/104740 dated Sep. 23, 2021 6 Pages (including translation).

*Primary Examiner* — Christopher W Fulton
(74) *Attorney, Agent, or Firm* — ANOVA LAW GROUP, PLLC

(57) ABSTRACT

The present disclosure discloses a method for using a laser level to track a detector and a laser tracking system. The method is applied to the laser level, which needs to use a fan-sweep mode or a dot-sweep mode. The method includes emitting a laser beam by the laser level to perform circular scanning, during the circular scanning, when the detector detects the laser beam, sending a detection signal to the laser level by the detector, when the laser level receives the detection signal, using the laser beam emitted by the laser level to perform circular scanning in an opposite direction, and when a frequency of the detection signal received by the laser level is greater than a first threshold, determining that the laser level tracks the detector.

13 Claims, 7 Drawing Sheets

(56) References Cited

U.S. PATENT DOCUMENTS

| | | | | |
|---|---|---|---|---|
| 9,581,442 | B2* | 2/2017 | Nishita | G01C 15/02 |
| 10,823,566 | B2* | 11/2020 | Lukic | G01J 1/0219 |
| 2019/0154444 | A1* | 5/2019 | Lukic | G01C 15/006 |
| 2020/0088879 | A1* | 3/2020 | Von Matern | G01S 17/08 |
| 2022/0082383 | A1* | 3/2022 | Sojic | G01C 25/00 |

FOREIGN PATENT DOCUMENTS

| | | |
|---|---|---|
| CN | 104914802 A | 9/2015 |
| CN | 206347995 U | 7/2017 |
| CN | 110730898 A | 1/2020 |
| CN | 112815929 A | 5/2021 |
| EP | 1420264 A1 | 5/2004 |

* cited by examiner

METHOD AND LASER TRACKING SYSTEM FOR USING LASER LEVEL TO TRACK DETECTOR

CROSS-REFERENCE TO RELATED APPLICATION

This application is a continuation application of International Application No. PCT/CN2021/104740, filed on Jul. 6, 2021, which claims priority of Chinese patent application No. 202011617437.1, filed with the State Intellectual Property Office of P. R. China on Dec. 31, 2020, the entire contents of both of which are incorporated herein by reference in their entirety.

TECHNICAL FIELD

The present disclosure relates to the intelligent measurement field and, more particularly, to a method and a laser tracking system for using a laser level to track a detector.

BACKGROUND

Horizontal axis precision of a laser level refers to a range of an included angle between a laser plane of the leveler and an absolute horizontal plane in each direction of four directions of the horizontal plane front, back, left, and right, when the laser level performs horizontal plane scanning after the laser level is normally leveled. According to geometric principles, the horizontal axis precision also represents a height range beyond a certain distance.

The existing method for calibrating the laser level is suitable for calibrating the laser level in the rotation scanning mode. Since a detector needs to distinguish a laser beam of the laser level from the ambient light, a feature of the laser level of "periodically scanning the detector to generate a photoelectric signal" is normally used. Generally, a period is required to be a certain value or several fixed values. Therefore, the existing calibration method is not suitable for the laser level operating in a fan-sweep mode or dot-sweep mode.

SUMMARY

For the above problem, a first aspect of the present disclosure provides a method for using a laser level to track a detector. The method is applied to the laser level, which needs to use a fan-sweep mode or a dot-sweep mode. The method includes:

emitting a laser beam by the laser level to perform circular scanning;

during the circular scanning, when the detector detects the laser beam, sending a detection signal by the detector to the laser level;

when the laser level receives the detection signal, using the laser beam emitted by the laser level to perform circular scanning in an opposite direction; and when a frequency of the detection signal received by the laser level is greater than a first threshold, determining that the laser level tracks the detector.

According to an exemplary embodiment of the present disclosure, before using the laser beam emitted by the laser level to perform the circular scanning, the method further includes adjusting the detector to be at a position where the detector is able to detect the laser beam emitted by the laser level.

According to an exemplary embodiment of the present disclosure, using the laser beam emitted by the laser level to perform the circular scanning further includes performing the circular scanning by the laser level in a first rate. The first rate is a rate that the detector is able to detect the laser beam.

According to an exemplary embodiment of the present disclosure, when the laser level receives the detection signal, using the laser beam emitted by the laser level to perform the circular scanning in the opposite direction further includes:

performing the circular scanning in the opposite direction by the laser level at a second rate, the second rate being smaller than a current rate of the laser level, and the second rate being a rate with which the detector is able to detect the laser beam.

According to an exemplary embodiment of the present disclosure, the method using the following step to replace determining that the laser level tracks the detector when the frequency of the detection signal received by the laser level is greater than a first threshold includes:

determining that the laser level tracks the detector when a time interval of changing a scanning direction of the circular scanning by the laser level is smaller than a second threshold.

According to an exemplary embodiment of the present disclosure, after the laser level tracks the detector, the method further includes:

setting the laser level to be in the fan-sweep mode or the dot-sweep mode at a position where the laser level tracks the detector.

For the above problem, a second aspect of the present disclosure provides a laser tracking system. The system includes:

a laser level configured to emit a laser beam to perform circular scanning; and a detector configured to obtain the laser beam;

wherein:

the detector further includes a first wireless communication circuit, when the detector detects the laser beam, the first wireless communication circuit of the detector sends a detection signal to the laser level; and the laser level further includes a second wireless communication circuit, and the second wireless communication circuit is configured to receive the detection signal.

According to an exemplary embodiment of the present disclosure, the detector is at a position where the detector is able to detect the laser beam emitted by the laser level.

According to an exemplary embodiment of the present disclosure, when the second wireless communication circuit receives the detection signal, the laser beam emitted by the laser level is used to perform the circular scanning in an opposite direction.

According to an exemplary embodiment of the present disclosure, the laser level is further configured to:

when the frequency of the detection signal received by the laser level is greater than a first threshold, determine that the detector is tracked.

According to an exemplary embodiment of the present disclosure, the laser level is further configured to, when a time interval of changing a scanning direction of the circular scanning by the laser level is smaller than a second threshold, determine that the detector is tracked.

According to an exemplary embodiment of the present disclosure, the laser level is further configured to enter a fan-sweep mode or a dot-sweep mode at a position where the detector is tracked.

With the method for using the laser level to track the detector and the laser tracking system of the present disclosure, the detecting of the detected position is realized flexibly, quickly, and accurately by causing the laser level to perform the circular scanning back and forth and assistance of the detector.

BRIEF DESCRIPTION OF THE DRAWINGS

The features, advantages, and other aspects of embodiments of the present disclosure will become more apparent in connection with the accompanying drawings and with reference to the following detailed description. Embodiments of the present disclosure are illustrated exemplarily non-limitingly. In the accompanying drawings.

DETAILED DESCRIPTION OF THE EMBODIMENTS

Various exemplary embodiments of the present disclosure are described in detail below with reference to the accompanying drawings. The flowchart and block diagrams in the accompanying drawings illustrate the architecture, function, and operation of possible implementations of the methods and systems according to embodiments of the present disclosure. It should be noted that each block in the flowchart or block diagram may represent a module, program segment, or portion of codes, which may include one or more executable instructions used to implement logic functions defined in embodiments of the present disclosure. It should also be noted that, in some alternative embodiments, the functions noted in the block may occur in a different order noted in the accompanying drawings. For example, two blocks shown in the connection may in fact be executed substantially in parallel, or the blocks may sometimes be executed in a reverse order, which depends upon the involved functions. It should also be noted that each block of the flowchart and/or block diagram and a combination of blocks in the flowchart and/or block diagram can be implemented using a dedicated hardware-based system that performs a specified function or operation or can be implemented using a combination of dedicated hardware and computer instructions The terms "including," "comprising," and similar terms used here should be understood as open-ended terms, i.e., "including/comprising but not limited to," which means that other contents may also be included. The term "based on" is "at least partially based on." The term "one embodiment" means "at least one embodiment." The term "another embodiment" means "at least one additional embodiment," and so on.

The present disclosure mainly focuses on the following technical problems: how to realize the calibration of the laser level when the laser level is in a dot-sweep mode or a fan-sweep mode.

In order to solve the above problem, according to a general concept of the present disclosure, a method for using a laser level to track a detector may be provided and may include emitting a laser beam by the laser level to perform circular scanning, during the circular scanning, when the detector detects the laser beam, sending a detection signal by the detector to the laser level, when the laser level receives the detection signal, performing the circular scanning in an opposite direction using the laser beam emitted by the laser level, and when a frequency of the detection signal received by the laser level is greater than a first threshold, determining that the laser level tracks the detector.

Embodiment 1

Figure 1:
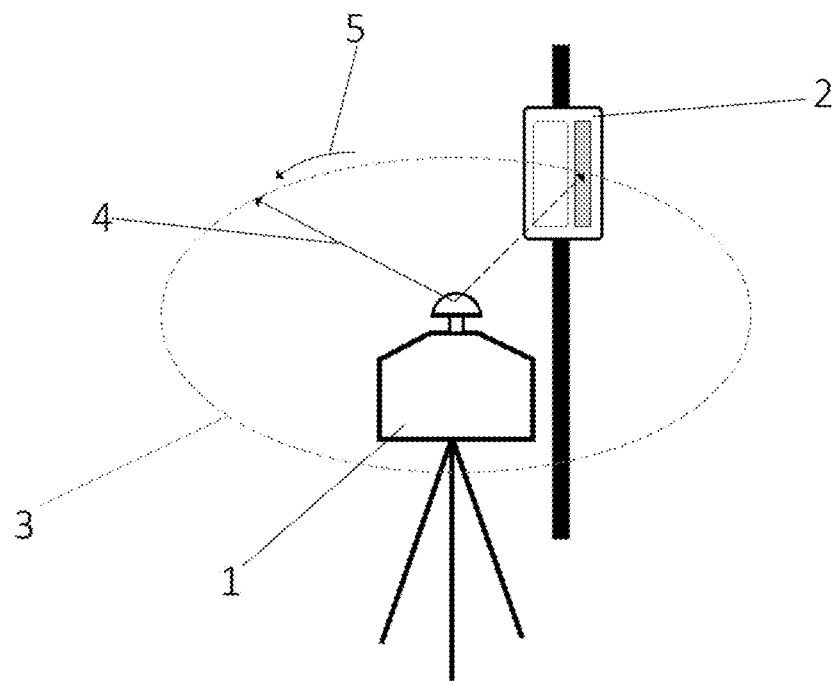
FIG. 1 is a schematic diagram of a system for calibrating a laser level according to an embodiment of the disclosure.

As shown in FIG. 1, a laser tracking system is disclosed and includes a laser level 1 and a detector 2. Detector 2 is at a position where detector 2 can detect the laser beam emitted by laser level 1. Before the calibration is performed on laser level 1, it is necessary to realize the tracking of laser level 1 to detector 2 to determine the detected position of laser level 1.

In this embodiment, laser level 1 may be at least configured to emit a laser beam to perform circular scanning. Detector 2 may be at least configured to receive the laser beam. Further, detector 2 may include a first wireless communication circuit, and laser level 1 may include a second wireless communication circuit. When detector 2 detects the laser beam, the first wireless communication circuit may send a detection signal to the second wireless communication circuit of laser level 1. The first wireless communication circuit and the second wireless communication circuit may be configured to implement wireless communication (e.g., Bluetooth communication technology, etc.) using any communication technology currently known or developed in the future.

Figure 3:
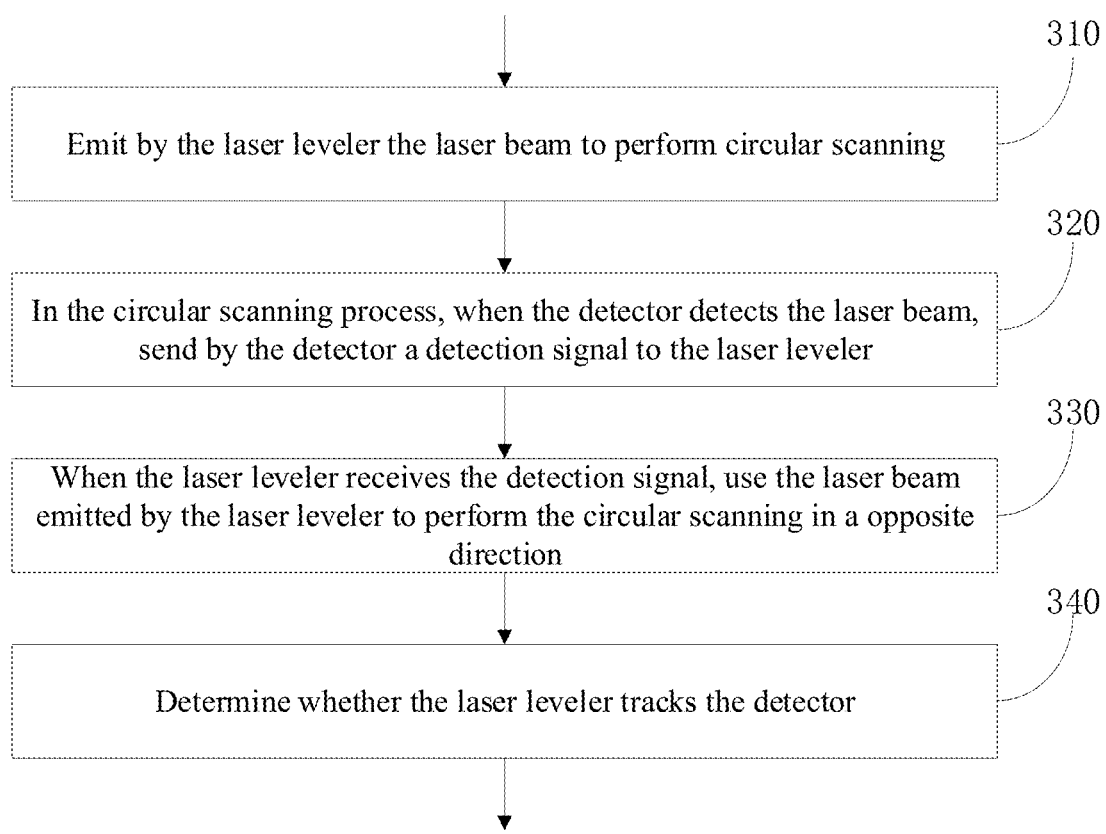
FIG. 3 is a schematic flowchart of a method of using a laser level to track a detector according to an embodiment of the disclosure.
Figure 4A:
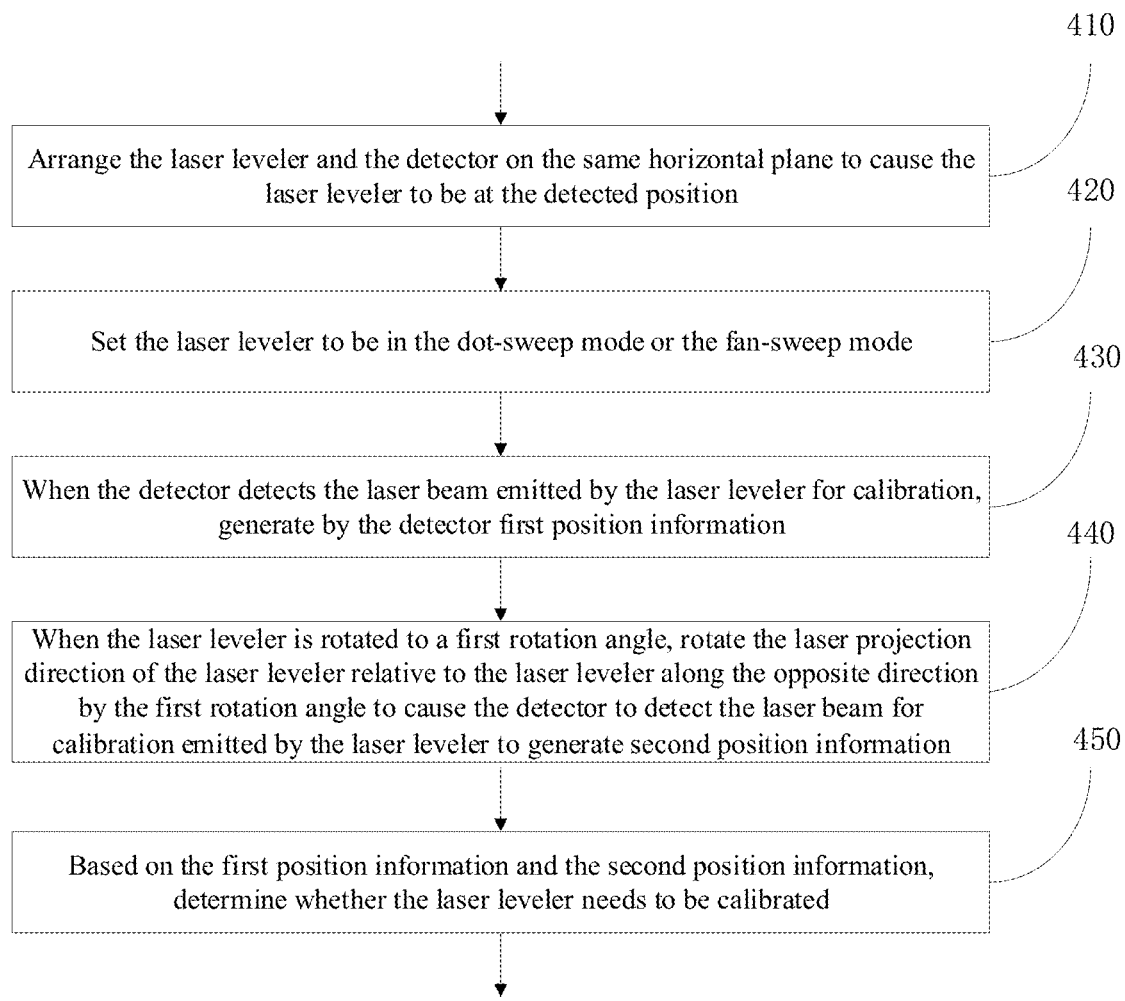
FIGS. 4A-4D are schematic flowcharts of a method of calibrating a laser level according to an embodiment of the disclosure.
Figure 4B:
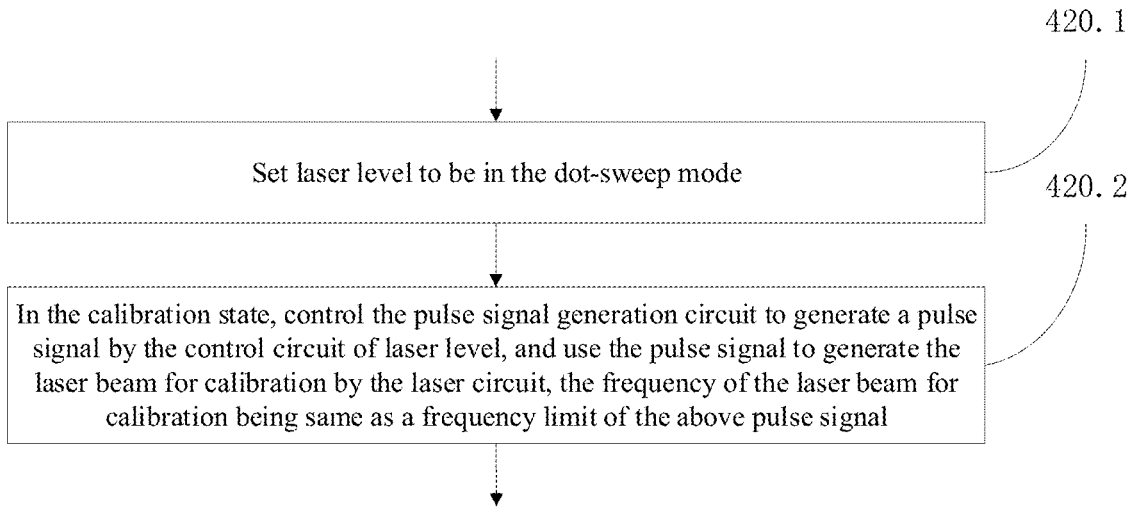
Figure 4C:
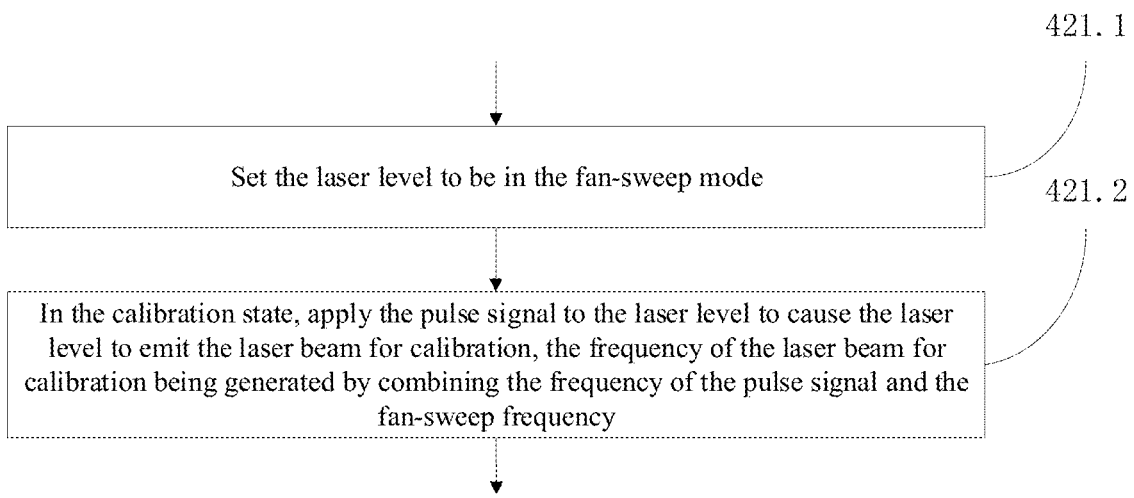
Figure 4D:
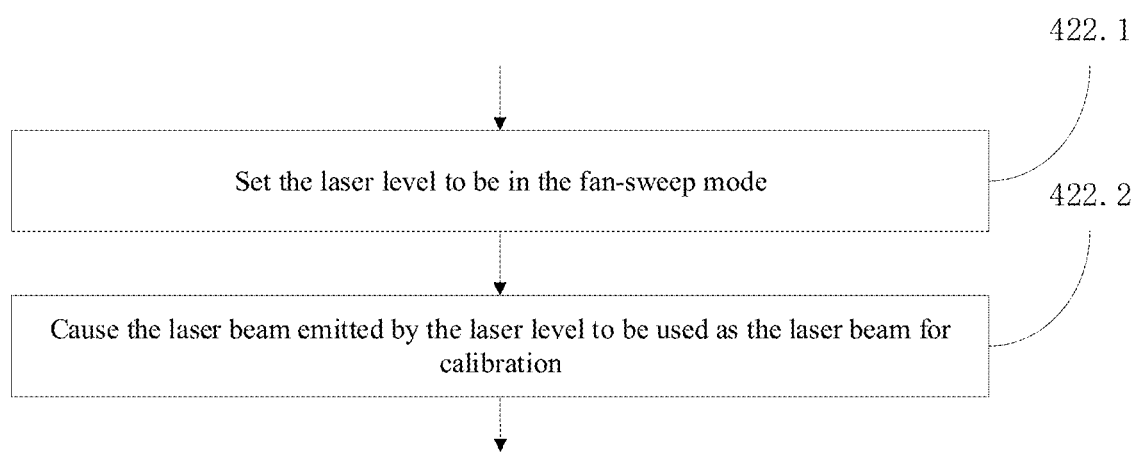

FIG. 3 discloses the method of using the laser level to track the detector in a laser tracking system of the present embodiment. The specific operation is as follows.

First, detector 2 may be adjusted to cause detector 2 to be at the position where the detector can detect the laser beam emitted by laser level 1. Communication between laser level 1 and detector 2 may be established simultaneously. In some embodiments, as shown in FIG. 1, laser level 1 and detector 2 are spaced at a fixed distance or a distance that can be measured by the detector. With the distance, detector 2 can precisely detect the laser beam emitted by laser level 1. Laser level 1 may emit a laser beam 4 and rotate circularly in a fixed rate (e.g., along a direction 5) to form a laser plane 3. Detector 2 may be arranged in a scan area of the laser plane 3. Thus, detector 2 may detect the laser beam emitted by laser level 1.

At 310, laser level 1 emits the laser beam to perform circular scanning.

In some embodiments, laser level 1 may perform the circular scanning at a first rate. The first rate is a rate at which detector 2 can detect the laser beam.

At 320, in the circular scanning process, when detector 2 detects the laser beam, detector 2 sends a detection signal to laser level 1.

In some embodiments, in the circular scanning process, when detector 2 detects the laser beam, the first wireless communication circuit may send the detection signal to the second wireless communication circuit of laser level 1.

At 330, when laser level 1 receives the detection signal, the laser beam emitted by laser level 1 is used to perform the circular scanning in an opposite direction.

In the present embodiment, in step 330, when the second wireless communication circuit of laser level 1 receives the detection signal, laser level 1 may perform the circular scanning in the opposite direction at a second rate. The second rate may be smaller than the current rate of the laser level. The second rate is the rate at which detector 2 can detect the laser beam.

Return to perform step 320, until a frequency of the detection signal received by the laser level is greater than a first threshold, step 340 may be performed.

Alternatively, return to perform step 320, until a time interval of changing the scanning direction of the circular scanning by laser level 1 is smaller than a second threshold, step 340 may be performed.

In this embodiment, in a process of repeatedly performing steps 320 and 330, the rate of the circular scanning performed by laser level 1 may decrease in a stepwise manner with the change of each scanning direction.

At 340, the laser level tracks the detector is determined.

In some embodiments, since laser level 1 performs the circular scanning back and forth (for example, after receiving the detection signal, the circular scanning in the opposite direction is realized), the frequency at which laser level 1 performs circular scanning back and forth may be higher and higher. Thus, the frequency of detector 2 receiving the laser beam may become higher, and the frequency of detector 2 sending the detection signal may be higher and higher. When the frequency of laser level 1 receiving the detection signal is higher than the threshold (e.g., first threshold) set internally, it indicates that laser level 1 has tracked detector 2, i.e., reaches the detected position.

Alternatively, since laser level 1 performs the circular scanning back and forth (for example, after receiving the detection signal, the circular scanning in the opposite direction is realized), thus, the frequency at which laser level 1 performs circular scanning back and forth may be higher and higher. When the time interval of laser level 1 changing the scanning direction of the circular scanning is smaller than the threshold (e.g., the second threshold) set internally, it indicates that laser level 1 has tracked detector 2, i.e., reaches the detected position.

In addition, after step 340, at the position where laser level 1 tracks detector 2, laser level 1 may be set to enter the fan-sweep mode or the dot-sweep mode.

The method and system for the laser level to track the detector disclosed in the present embodiment may realize tracking the detector by the laser level to accurately determine the detected position only in the situation that the detector can receive the laser beam when a leveling operation does not need to be performed on the laser level and the detector. That is, the method and system for tracking the detector by the laser level disclosed in Embodiment 1 may be simply operated, have a simple structure, and realize accurate positioning for the detected position.

Embodiment 2

As shown in FIG. 1, the system for calibrating the laser level is disclosed and includes a laser level 1 configured to generate the laser beam for calibration in a calibration state and a detector 2 configured to obtain the laser beam for calibration. Laser level 1 and detector 2 are arranged on the same horizontal plane. Thus, laser level 1 is at the detected position. Laser level 1 may be set to the dot-sweep mode or the fan-sweep mode.

Figure 2:
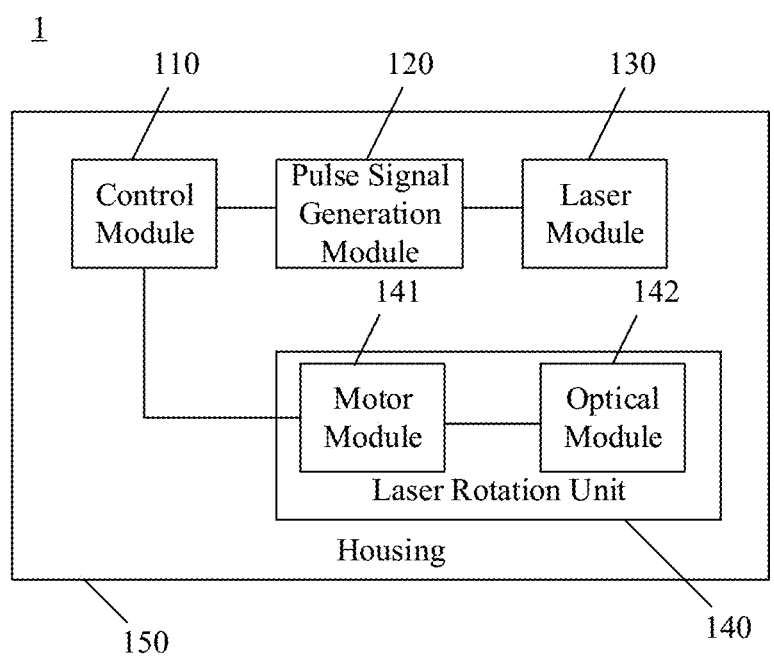
FIG. 2 is a schematic block diagram of a system for calibrating a laser level according to an embodiment of the disclosure.

In addition, laser level 1 shown in FIG. 2 includes a housing 150, a control circuit 110, a pulse signal generation circuit 120, a laser circuit 130, and a laser rotation unit 140. The control circuit 110 may be arranged in the housing 150. The pulse signal generation circuit 120 may be arranged in the housing 150 and be electrically coupled to the control circuit 110 to be controlled by the control circuit 110 to generate a pulse signal. The laser circuit 130 may be arranged in the housing 150 and be electrically coupled with the pulse signal generation circuit 120. In the calibration state, with the pulse signal, the laser circuit 130 may be configured to generate the laser beam for calibration. The laser rotation unit 140 may be arranged in the housing 150, be electrically coupled with the control circuit 110, and be configured to control and adjust the projection direction of the laser beam generated by the laser circuit 130.

In addition, the laser rotation unit 140 includes a motor 141 and an optical circuit 142. The motor 141 may be electrically coupled to the control circuit 110. The optical circuit 142 may be electrically coupled to the motor 141 and configured to change the direction of the laser beam. When the control circuit 110 controls the motor 141 to drive the optical circuit 142 to rotate, the direction of the laser beam emitted by laser level 1 may be changed.

Based on the system of using the laser level to track the detector disclosed in Embodiment 1, laser level 1 can accurately determine the detected position corresponding to the detector. FIG. 3 shows the method of using the laser level to track the detector in the laser tracking system of the present embodiment. The laser tracking system is also configured to perform a method for calibrating the laser level. The method for calibrating the laser level is disclosed in FIGS. 4A-4D. In some embodiments, the process shown in FIGS. 4A-4D can be performed after the process shown in FIG. 3 is completed.

FIGS. 4A-4D disclose the method for the calibration laser level of the present embodiment. The specific operation is as follows.

At 410, laser level 1 and detector 2 are arranged on the same horizontal plane to cause laser level 1 to be at the detected position.

Figure 5:
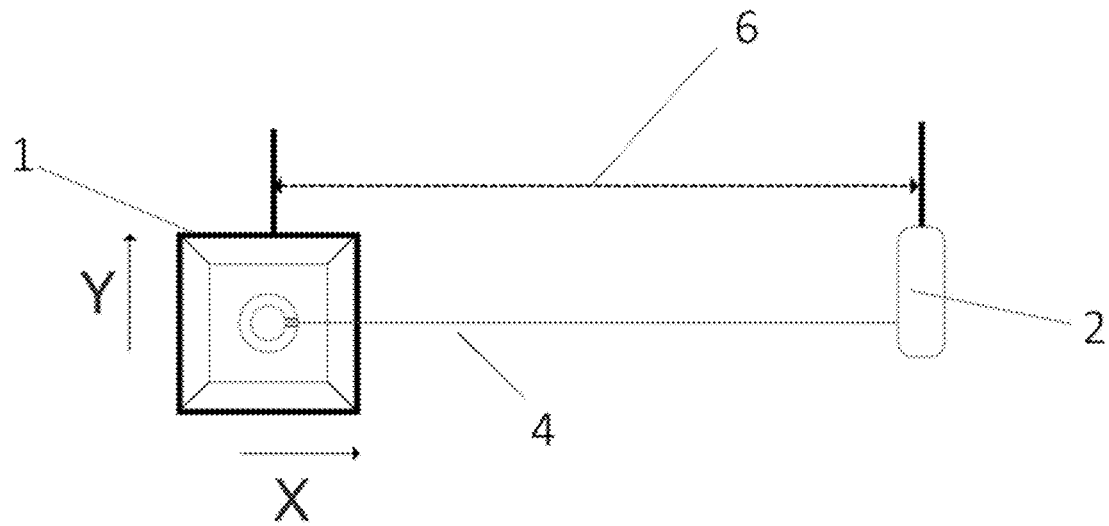
FIG. 5 is a first schematic diagram showing calibrating a laser level according to an embodiment of the disclosure.

As shown in FIG. 5, in this step, laser level 1 and detector 2 are arranged on the same horizontal plane with the distance 6. Before laser level 1 is ready to emit the laser beam for calibration to detector 2, the leveling operation may be performed on laser level 1. In some embodiments, after laser level 1 is turned on, an automatic leveling operation may be first performed. That is, laser level 1 may adjust an X-axis and a Y-axis to a horizontal state determined by laser level 1 through water bubble detection.

At 420, laser level 1 is set to be in the dot-sweep mode or the fan-sweep mode.

Detector 2 can receive beams of various frequencies (for example, natural light, etc.) from a calibration environment during the calibration process of laser level 1. In addition, laser level 1 is in the dot-sweep mode or the fan-sweep mode, which is different from the conventional leveler configured to emit a periodical laser beam for the detector to receive different beams. Thus, to cause detector 2 to accurately receive the laser beam from laser level 1 and overcome the existing technical defects, laser level 1 needs to still emit the laser beam with a single frequency that has on-off or bright-dark changes in the dot-sweep mode or fan-sweep mode to facilitate detection of detector 2.

This Step Includes:

at 420.1, setting laser level 1 to be in the dot-sweep mode; and at 420.2, in the calibration state, controlling the pulse signal generation circuit 120 to generate a pulse signal by the control circuit 110 of laser level 1, and using the pulse signal to generate the laser beam for calibration by the laser circuit 130, the frequency of the laser beam for calibration being same as a frequency limit of the above pulse signal.

In some embodiments, step 420 includes:

at 421.1, setting laser level 1 to be in the fan-sweep mode; and at 421.2, in the calibration state, applying the pulse signal to laser level 1 to cause laser level 1 to emit the laser beam for calibration. The frequency of the laser beam for calibration may be generated by combining the frequency of the pulse signal and the fan-sweep frequency. In some embodiments, the control circuit 110 of laser level 1 may control the pulse signal generation circuit 120 to generate the pulse signal. The laser circuit 130 may use the pulse signal to generate the laser beam for calibration.

The pulse signal mentioned in this embodiment has a fixed frequency or a variable frequency that can be detected by detector 2.

In some embodiments, step 420 includes:

at 422.1, setting laser level 1 to be in the fan-sweep mode; and at 422.2, causing the laser beam emitted by laser level 1 to be used as the laser beam for calibration.

That is, in the fan-sweep mode, the fan-sweep frequency of laser level 1 may be used as the frequency of the laser beam for calibration received by detector 2.

At 430, when detector 2 detects the laser beam emitted by laser level 1 for calibration, the detector generates first position information.

Figure 6:
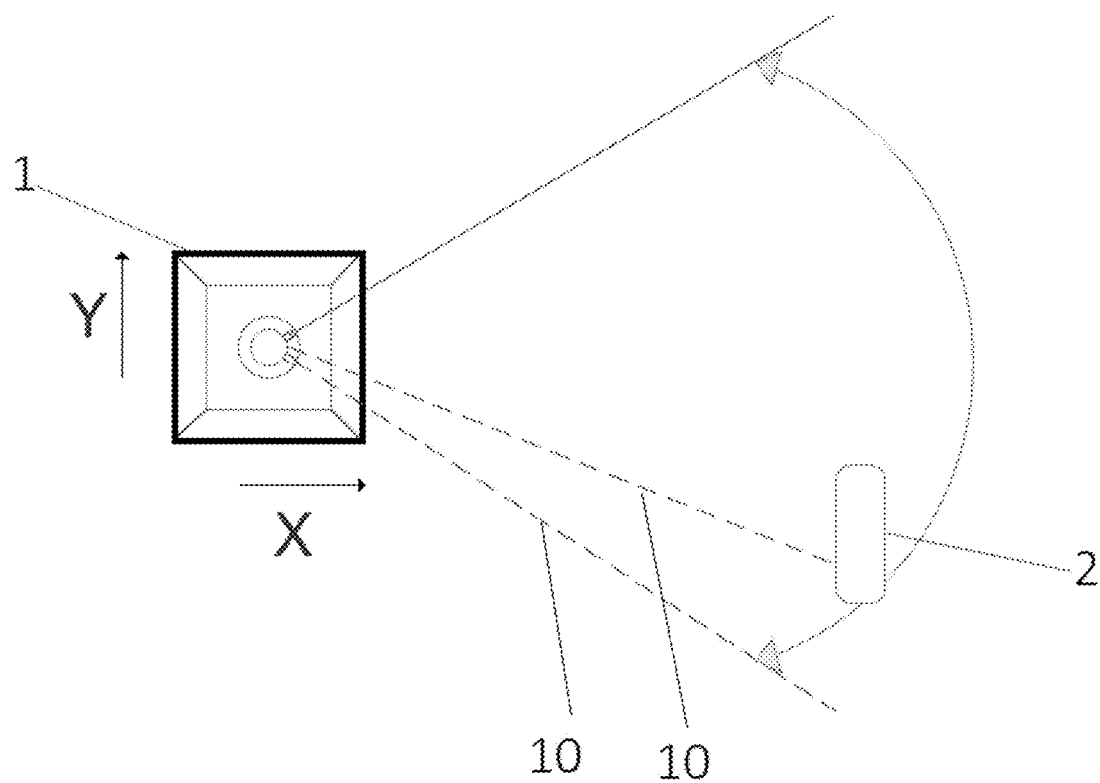
FIG. 6 is a second schematic diagram showing calibrating a laser level according to an embodiment of the disclosure.

As shown in FIG. 6, laser level 1 performs a circular motion, so that the laser beam 10 for calibration emitted by laser level 1 is detected by detector 2.

Figure 7:
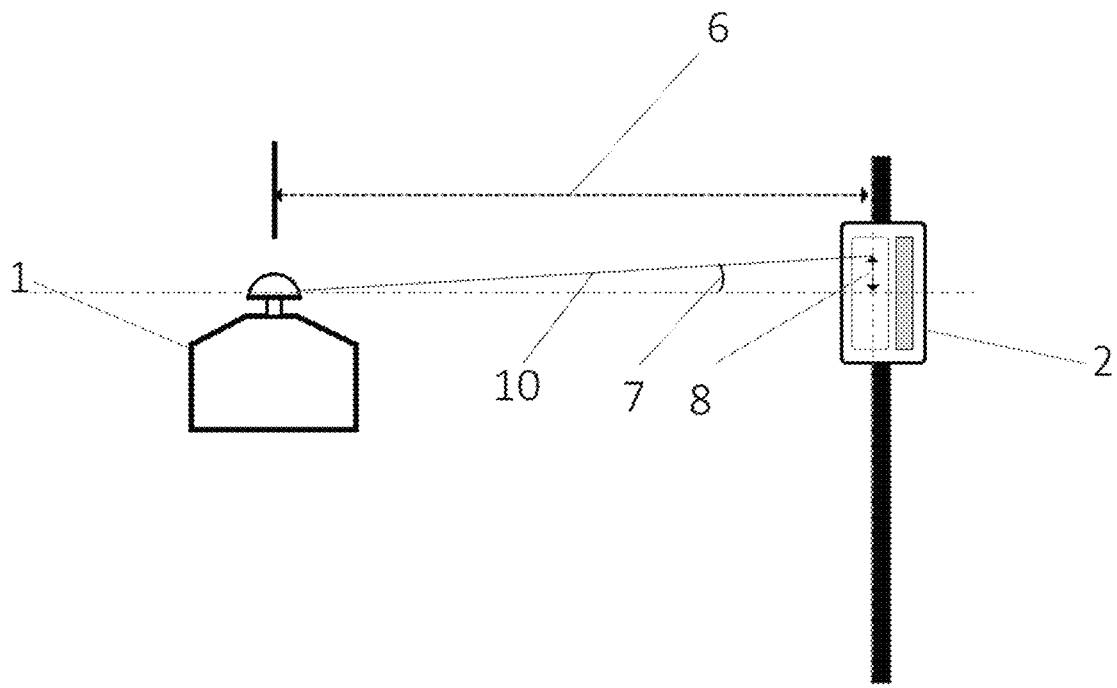
FIG. 7 is a third schematic diagram showing calibrating a laser level according to an embodiment of the disclosure.

As shown in FIG. 7, when detector 2 detects the laser beam 10 for calibration emitted by laser level 1, the first position information detected by the detector is first height information 8 or first angle information 7 generated based on the distance 6 and the first height information 8.

At 440, when laser level 1 is rotated to a first rotation angle, the laser projection direction of the laser level is rotated relative to the laser level along the opposite direction by the first rotation angle to cause the detector to detect the laser beam for calibration emitted by the laser level to generate second position information.

In some embodiments, when laser level 1 is rotated to the first rotation angle, laser level 1 may perform the leveling operation again. In this embodiment, the first rotation angle may be any angle, preferably 90°, 180°, and 270°. According to the selected angle, the calibration process may need to be repeatedly performed many times. For example, after the calibration of the X-axis is completed, laser level 1 is rotated by 90°, and the same operation as the calibration of the X-axis may be repeated to realize the calibration of the Y-axis.

When the housing 150 is rotated to the first rotation angle, the laser rotation unit 140 may be rotated relative to the housing 150 by the first rotation angle in the opposite direction. Thus, the laser beam 10 for calibration emitted by the laser circuit 130 may be received by detector 2.

Figure 8:
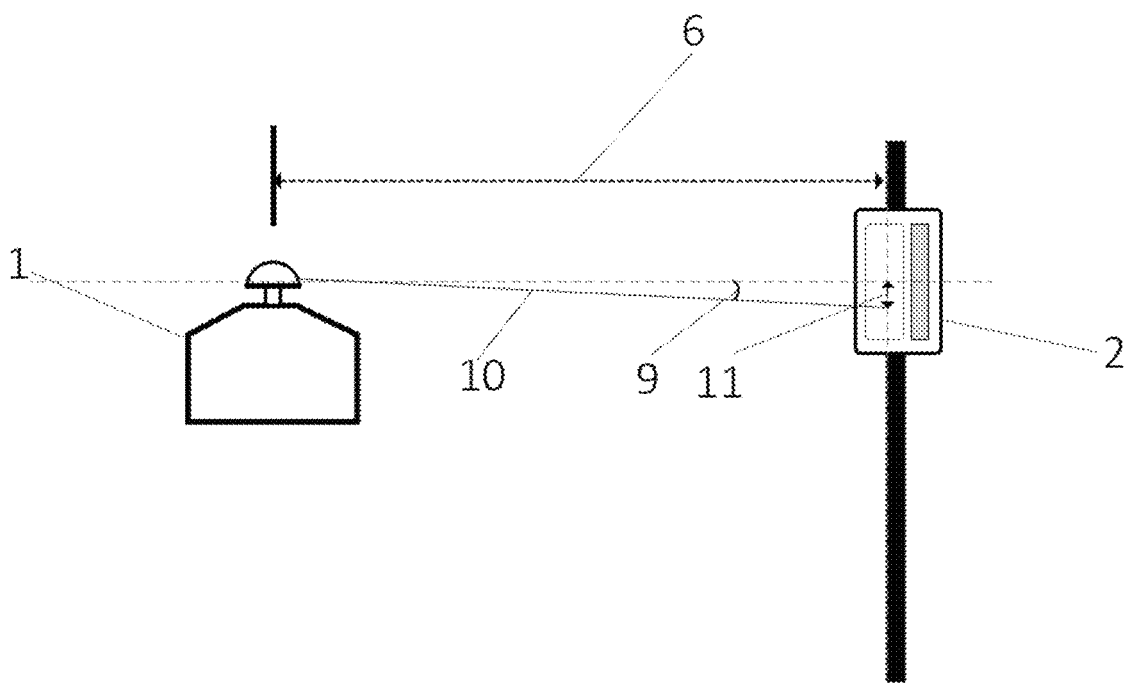
FIG. 8 is a fourth schematic diagram showing calibrating a laser level according to an embodiment of the disclosure.

As shown in FIG. 8, when detector 2 detects the laser beam 10 for calibration emitted by laser level 1, the second position information detected by detector 2 is second height information 11 or second angle information 9 generated based on the distance 6 and the second height information 11.

At 450, based on the first position information and the second position information, whether the laser level needs to be calibrated is determined.

This Step Includes:

receives the first position information and the second position information by laser level 1, generating the calibration information, and when the calibration information exceeds a set threshold, performing calibration based on the calibration information; or receiving the calibration information generated by detector 2 based on the first position information and the second position information by laser level 1, and when the calibration information exceeds the set threshold, performing the calibration based on the calibration information; or generating the calibration information based on the first position information and the second position information by detector 2, and when the calibration information exceeds the set threshold, sending the calibration information to laser level 1 to cause laser level 1 to perform the calibration based on the calibration information.

In this embodiment, for example, the calibration information may be an average value of differences between the first height information 8 and the second height information 11 or an average value of differences between the first angle information 7 and the second angle information 9.

The disclosed method and system for calibrating the laser level of the present embodiment can realize the calibration when the laser level is in the dot-sweep mode or the fan-sweep mode, which greatly improves the application scope of the calibration technique and brings greater convenience for an actual user of the laser level.

Techniques, methods, and devices known to those of ordinary skill in the art may not be discussed in detail, but where appropriate, such techniques, methods, and devices should be considered a part of the specification. The connection lines between the units in the accompanying drawings are only for the convenience of description, which means that at least the units at both ends of the lines communicate with each other and are not intended to limit the unconnected units not to communicate.

The above are only some embodiments of the present disclosure and are not intended to limit embodiments of the present disclosure. For those skilled in the art, embodiments of the present disclosure may have various modifications and changes. Any modifications, equivalent replacements, improvements, etc. made within the spirit and principles of embodiments of the present disclosure should be included within the protection scope of embodiments of the present disclosure.

Although embodiments of the present disclosure have been described with reference to several specific embodiments, it should be understood that embodiments of the present disclosure are not limited to the specific embodiments disclosed. Embodiments of the present disclosure are intended to cover various modifications and equivalent arrangements included within the spirit and scope of the appended claims. The scope of the appended claims conforms to the broadest interpretation so as to include all such modifications and equivalent structures and functions.

What is claimed is:

1. A method of using a laser level to track a detector comprising:
   emitting a laser beam by the laser level to perform circular scanning;
   during the circular scanning, in response to the detector detecting the laser beam, sending a detection signal by the detector to the laser level;
   in response to the laser level receiving the detection signal, using the laser beam emitted by the laser level to perform circular scanning in an opposite direction; and
   in response to a frequency of the detection signal received by the laser level being greater than a first threshold, determining that the laser level tracks the detector.

2. The method of claim 1, further comprising, before using the laser beam emitted by the laser level to perform the circular scanning:
   adjusting the detector to be at a position where the detector is able to detect the laser beam emitted by the laser level.

3. The method of claim 1, wherein using the laser beam emitted by the laser level to perform the circular scanning further includes:
   performing the circular scanning by the laser level in a first rate, the first rate being a rate at which the detector is able to detect the laser beam.

4. The method of claim 1, wherein in response to the laser level receiving the detection signal, using the laser beam emitted by the laser level to perform the circular scanning in the opposite direction further includes:
   performing the circular scanning in the opposite direction by the laser level at a second rate, the second rate being smaller than a current rate of the laser level, and the second rate being a rate at which the detector is able to detect the laser beam.

5. The method of claim 1, further comprising:
   determining that the laser level tracks the detector when a time interval of changing a scanning direction of the circular scanning by the laser level is smaller than a second threshold.

6. The method of claim 1, further comprising, after the laser level tracks the detector:
   setting the laser level to be in the fan-sweep mode or the dot-sweep mode at a position where the laser level tracks the detector.

7. A laser tracking system comprising:
   a laser level configured to emit a laser beam to perform circular scanning; and
   a detector configured to obtain the laser beam;
   wherein:
      the detector further includes a first wireless communication circuit configured to send a detection signal to the laser level in response to the detector detecting the laser beam;
      the laser level further includes a second wireless communication circuit configured to receive the detection signal; and
      in response to the frequency of the detection signal received by the laser level being greater than a first threshold, the laser level is configured to determine that the detector is tracked.

8. The system of claim 7, wherein the detector is at a position where the detector is able to detect the laser beam emitted by the laser level.

9. The system of claim 7, wherein in response to the second wireless communication circuit receiving the detection signal, the laser beam emitted by the laser level is used to perform the circular scanning in an opposite direction.

10. The system of claim 7, wherein the laser level is further configured to:
    in response to a time interval of changing a scanning direction of the circular scanning by the laser level being smaller than a second threshold, determine that the detector is tracked.

11. The system of claim 10, wherein the laser level is further configured to:
    enter a fan-sweep mode or a dot-sweep mode at a position where the detector is tracked.

12. The system of claim 7, wherein the laser level is further configured to:
    perform the circular scanning in a rate, the rate being a rate at which the detector is able to detect the laser beam.

13. The system of claim 7, wherein the laser level is further configured to:
    perform the circular scanning in the opposite direction at a rate, the rate being smaller than a current rate of the laser level, and the rate being a rate at which the detector is able to detect the laser beam.

* * * * *